G. H. PAYNE.
SOD REMOVER.
APPLICATION FILED SEPT. 25, 1916.

1,230,320.

Patented June 19, 1917.
3 SHEETS—SHEET 1.

Witnesses

George H. Payne,
Inventor by
Attorneys

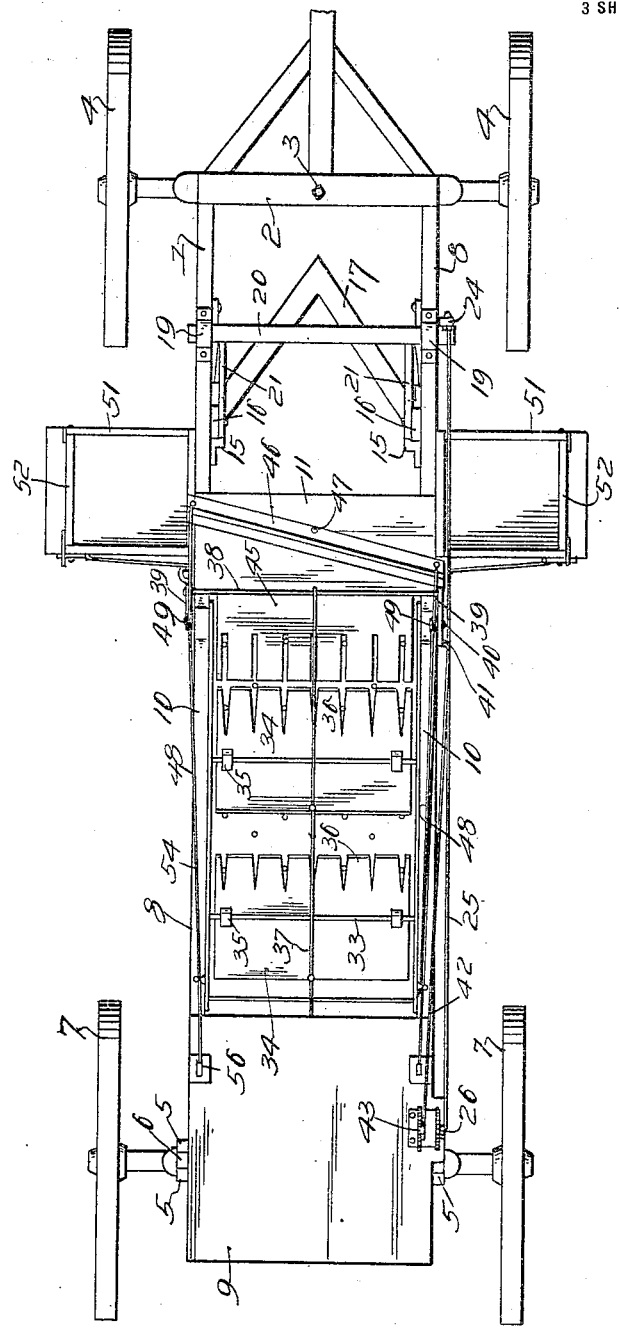

G. H. PAYNE.
SOD REMOVER.
APPLICATION FILED SEPT. 25, 1916.
1,230,320.
Patented June 19, 1917.
3 SHEETS—SHEET 3.
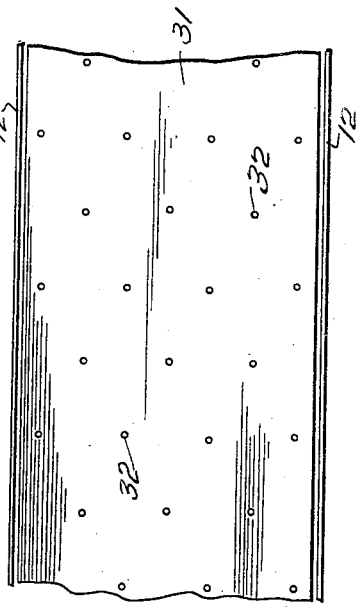
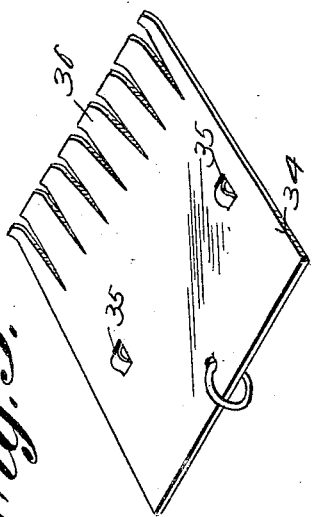
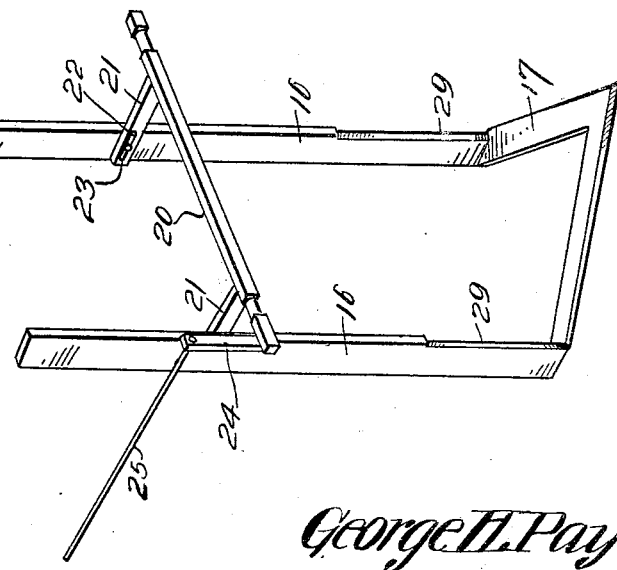
Witnesses
George H. Payne,
Inventor
by C. A. Snow & Co.,
Attorneys

UNITED STATES PATENT OFFICE.

GEORGE H. PAYNE, OF YUMA, ARIZONA.

SOD-REMOVER.

1,230,320. Specification of Letters Patent. Patented June 19, 1917.

Application filed September 25, 1916. Serial No. 122,137.

*To all whom it may concern:*

Be it known that I, GEORGE H. PAYNE, a citizen of the United States, residing at Yuma, in the county of Yuma and State of Arizona, have invented a new and useful Sod-Remover, of which the following is a specification.

The device forming the subject matter of this application is adapted to be employed for removing sod, and particularly for removing the sod of Bermuda grass, a pest which infests the soil to a marked extent in some sections.

The invention aims to provide novel means whereby the depth to which the sod is removed may be regulated.

Another object of the invention is to provide novel means for cleaning the sod of earth as it is elevated by a rotating drum.

A further object of the invention is to provide novel means for conveying the sod in opposite directions, to the sides of the machine, at the will of an operator.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 2 is a top plan of a sod remover constructed in accordance with the present invention;

Fig. 3 is a detail perspective view illustrating the means whereby the sod is cut;

Fig. 4 is a fragmental plan of the sod transporting drum; and

Fig. 5 is a perspective showing one of the scrapers.

Figure 1:
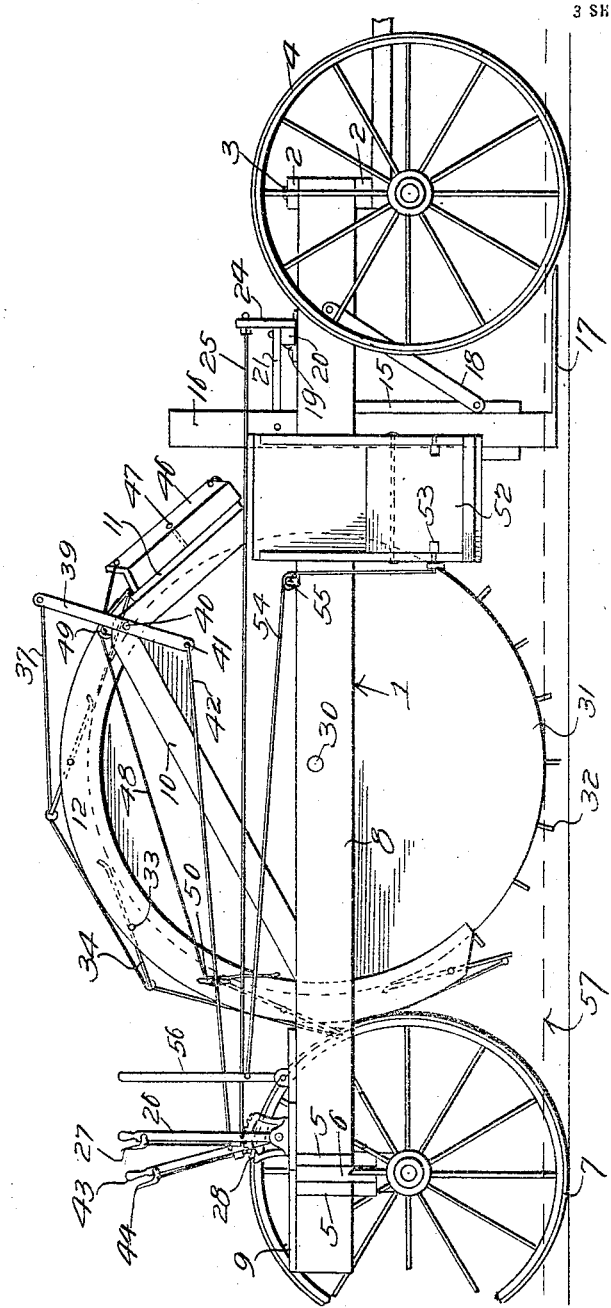
Figure 1 shows in side elevation, a sod remover constructed in accordance with the present invention, the sod remover being mounted upon trucks, and appearing as it will look during transportation.

In carrying out the invention there is provided a main frame which is denoted generally by the numeral 1, and preferably is of rectangular outline. The frame 1 includes head bars 2, side bars 8, and a rear platform 9. The head bars 2 are adapted to receive a king bolt 3 whereby the lower end of the main frame 1 may be connected with a truck 4. The truck 4 may be simply the forward wheels of a farm wagon. The side beams 8 of the main frame 1 may be equipped with cleats 5 adapted to receive the side stakes 6 of the truck 7, which may be the rear wheels of a farm wagon. The trucks 7 and 4 are used merely to support the machine from place to place, and therefore they need not be considered further in this description, since when the device is in operation, the main frame 1 is used without the trucks 4 and 7.

Fixed to and upstanding from the side beams 8 of the main frame 1 are V-shaped auxiliary frames 10, the forward portions of which carry a forwardly and downwardly inclined table 11. Arcuate guards 12 connect the auxiliary frames 10 with the side beams 8.

Fixed to the side beams 8 of the main frame 1 are guides 15 in which are mounted to reciprocate vertically, uprights 16 carrying a horizontal knife 17 of any desired form. The guides 15 are sustained by means of braces 18 connected with the side beams 8. Adjacent the knife 17, the uprights 16 are sharpened on their forward edges as shown at 29. Bearings 19 are mounted on the side beams 8 and a shaft 20 is mounted to rock in the bearings. The shaft 20 is provided with rearwardly extended arms 21 having slots 22 receiving connections, in the form of pins 23 mounted in the uprights 16. The shaft 20 has a finger 24 to which is pivoted a rod 25, the rod 25 being pivoted at its rear end to a lever 26 fulcrumed on the platform 9. The lever 26 has a latch mechanism 27 coacting with a segment 28 on the platform 9.

The knife 17 is adapted to move horizontally beneath the surface of the soil, the surface of the soil being designated by the reference character 57 in Fig. 1. The sharpened edges 29 of the uprights 16, coöperating with the knife 17, cut a strip of sod from the soil. It is possible to raise and lower the knife 17, so as to regulate the depth at which the knife operates. This operation is carried out by swinging the lever 26, whereupon the rod 25 will rock the shaft 20 through the medium of the finger 24, the arms 21 raising and lowering the uprights 16, and the latter sliding in the guides 15.

Journaled for rotation in the side beams 8 intermediate the front and the rear of the machine is a shaft 30 on which is mounted a drum 31 having teeth 32. The drum 31 rotates in contact with the ground, and the teeth 32 pick up the sod which has been cut loose by the knife 17, and the edges 29 of the upright 16. The sod is carried upwardly on the periphery of the drum 31, between the arcuate guards 12.

The arcuate guards 12 are connected by shafts 33. The numeral 34 designates any desired number of scrapers having bearings 35 receiving the shafts 33. The scrapers 34 are equipped with forwardly presented teeth 36, spaced apart to permit the passage of the teeth 32 of the drum 31. In forming the teeth 36, enough material is removed so that the butt ends of the scrapers are heavier than the toothed ends thereof. The toothed ends of the scrapers, therefore, tend to swing away from the periphery of the drum 31. The scrapers are connected with a flexible element 37 united at its forward end with a cross rod 38 carried by the upper ends of levers 39 fulcrumed at 40 on the guards 12. One of the levers 40 has a depending extension 41 shown in Fig. 1. With the extension 41 is pivotally assembled the forward end of a rod 42, the rear end of which is connected with a lever 43 fulcrumed on the platform 9 and provided with a latch 44 adapted to engage a suitable segment 44ª on the platform.

When the drum 31, laden with the loose sod, rotates, the sod comes into contact with the scrapers 34 and the dirt is removed from the sod, as the sod travels upwardly on the periphery of the drum. By manipulating the lever 43, the position of the scrapers 34 with respect to the drum 31 may be adjusted and the scrapers may be made to bear with a varying pressure on the sod as it is carried upwardly by the drum 31.

The numeral 45 indicates a downwardly slanting toothed collector connected with the rear edge of the table 11. The sod as it is carried forwardly on the top of the drum 31 is received by the collector 45 and is passed forwardly onto the table 11.

A transverse deflector 46 is pivoted intermediate its ends as shown at 47 on the table 12. Flexible elements 48 are connected with the ends of the collector 45 and are carried rearwardly across sheaves 49 mounted on the auxiliary frames 10. The rear ends of the flexible elements 48 may be connected with cleats 50 carried by the side guards 12.

It will now be understood that, by a suitable manipulation of the flexible elements 48, the collector 45 may be tilted on its fulcrum 47, so that the sod as it moves downwardly along the table 11 will be carried toward the right hand side of the machine or toward the left hand side of the machine.

Secured to the side beams 8 of the main frame 1 and projecting in opposite directions are chutes 51 provided with swinging doors 52 held in place by latches 53. Connected with the latches 53 are flexible elements 54 trained over sheaves 55 on the side beams 8. The rear ends of the flexible elements 54 are united with levers 56 fulcrumed on the platform 9.

The sod accumulates in one or the other of the chutes 51, depending upon the position of the deflector 46. When a sufficient quantity of sod is collected in one or both of the chutes 51, one or both of the levers 56 are manipulated, and then the flexible elements 54 will disengage the latches 53 from the doors 52, whereupon the doors will swing open and permit the sod to pass out of the chutes 51, after which, the doors 52 will drop by gravity into closed positions and engage with the latches 53.

The operation of the device has been dealt with hereinbefore step by step, but generally considered it is as follows. The knife 17 may be raised and lowered to regulate the depth at which the same operates beneath the surface of the soil. By means of the knife 17 and adjacent parts, a strip of sod is cut from the soil. This sod is picked up by the teeth 32 on the drum 31 and as the drum rotates, the dirt is removed from the sod by the action of the scrapers 34. The collector 45 deposits the sod on the table 11 and the deflector 46 carries the sod to the right or to the left, into one or both of the chutes 51, depending upon the position of the deflector. At stated intervals the sod may be dumped out of the chutes 51 by opening the doors 52.

Having thus described the invention, what is claimed is:—

1. In a sod remover, a main frame; a collecting drum journaled on the main frame; a sod knife vertically adjustable on the main frame in front of the drum; means for raising and lowering the sod knife; a scraper mounted to move on the main frame and coacting with the periphery of the drum; means for adjusting the position of the scraper with respect to the periphery of the drum; a table carried by the frame; a collector receiving the sod from the drum and discharging onto the table; a deflector mounted to swing on the table; means for holding the deflector in adjusted positions to cause the deflector to discharge toward opposite sides of the main frame; chutes carried by opposite sides of the main frame and receiving the material from the deflector; closures for the chutes; and means for manipulating the closures.

2. In a device of the class described, a main frame; a knife carried by the main frame; a drum journaled on the main frame to the rear of the knife; a scraper mounted to swing on the main frame and coacting with the periphery of the drum; means for adjusting the position of the scraper with respect to the drum; and means for receiving the material from the drum.

3. In a device of the class described, a main frame; a sod knife carried by the frame; a sod collecting drum journaled on the frame to the rear of the knife; a plurality of scrapers connected movably with the frame and coacting with the periphery of the drum; a connection uniting all of the scrapers; and means for operating the connection to cause an adjustment in the position of all of the scrapers with respect to the periphery of the drum.

4. In a device of the class described, a main frame; a sod knife carried by the main frame; a sod collecting drum journaled on the main frame to the rear of the knife; a table carried by the frame; a collector receiving the material from the drum and discharging on the table; a deflector pivotally mounted on the table and movable to discharge the sod toward one side of the frame or toward the other side of the frame; and means for operating the deflector.

5. In a device of the class described, a frame; a sod knife vertically movable on the frame; means for raising and lowering the sod knife; a sod collecting drum journaled on the frame to the rear of the knife; a scraper movably mounted on the frame and coacting with the periphery of the drum; means for adjusting the position of the scraper with respect to the drum; a deflector mounted on the frame and tiltable to discharge toward opposite sides of the frame; means for receiving the sod from the drum and discharging the sod against the deflector; and means for operating the deflector to cause the same to discharge toward opposite sides of the frame.

6. In a device of the class described, a main frame; a vertically movable sod knife carried by the frame adjacent the forward end of the frame; means for raising and lowering the sod knife; mechanism for operating said means from a point adjacent the rear end of the frame; a sod collecting drum journaled on the frame to the rear of the sod knife; a pivotally mounted scraper carried by the frame and coacting with the periphery of the drum; means for manipulating the scraper from a point adjacent the rear end of the frame; a tiltably mounted deflector carried by the frame; means for receiving the sod from the drum and for discharging the sod against the deflector; means for manipulating the deflector from a point adjacent the rear end of the frame to cause the deflector to discharge toward opposite sides of the frame; chutes carried by the frame and selectively receiving the sod from the deflector; closures for the chutes; and mechanism for manipulating the closures from a point adjacent the rear end of the frame.

In testimony that I claim the foregoing as my own, I have hereto affixed my signature in the presence of two witnesses.

GEORGE H. PAYNE.

Witnesses:
John Doan,
Bernys McVay.

Copies of this patent may be obtained for five cents each, by addressing the "Commissioner of Patents, Washington, D. C."